Feb. 13, 1962  F. P. MUSSO  3,020,823
PISTON AND CYLINDER ACTION COFFEE MAKER
Filed April 6, 1959  2 Sheets-Sheet 2

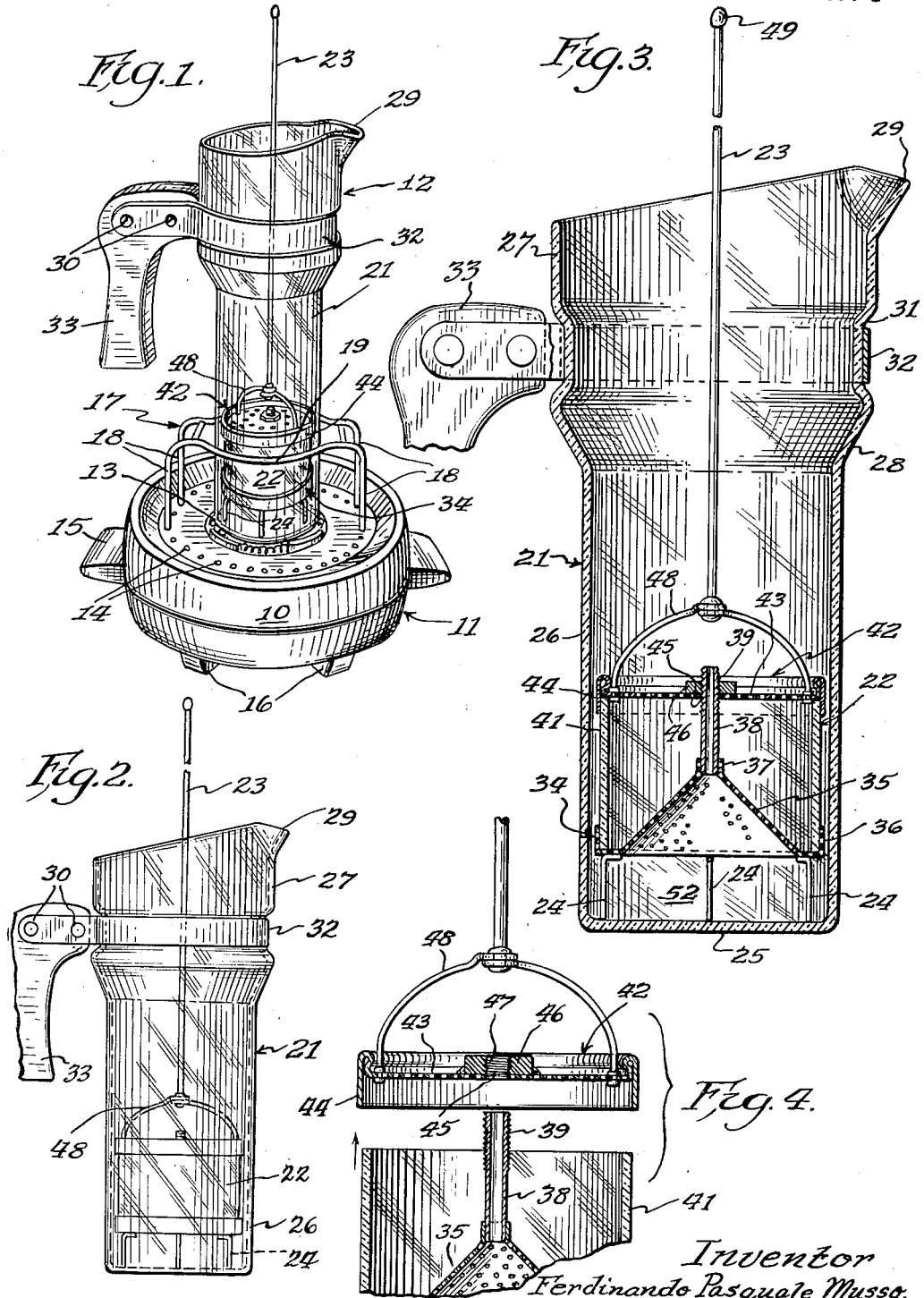

Inventor
Ferdinando Pasquale Musso
By Mann, Brown & McWilliams
Att'ys

United States Patent Office 3,020,823
Patented Feb. 13, 1962

3,020,823
PISTON AND CYLINDER ACTION
COFFEE MAKER
Ferdinando Pasquale Musso, LaSalle Hotel, Chicago, Ill.
Filed Apr. 6, 1959, Ser. No. 804,507
7 Claims. (Cl. 99—287)

This invention relates to an improved method and apparatus for brewing coffee.

The early history of the use of coffee is obscure. Its use in Abyssinia was recorded in the 15th century, and it was then stated to have been practiced from time immemorial. Coffee as a beverage in Europe dates from the 17th century. Since that time the coffee-drinking habit has spread throughout the world and coffee now occupies a most prominent position among agricultural products. The export of coffee from the principal producing countries during the year 1957 was in excess of five billion pounds.

As the use of coffee became widespread, several principal methods were developed whereby the roasted and ground beans were subjected to the final step—the brewing of the beverage itself.

The novelty of this invention is in that a method is disclosed wherein, during the brewing process, the ground coffee is maintained in constant and vigorous agitation, thus facilitating a complete and rapid extraction of the flavor and essence of the coffee. The apparatus used to establish this turbulent system is also a part of the present invention and will be described in detail in another part of this disclosure.

According to this invention it is possible using the apparatus described, or some embodiment of said apparatus, to make coffee in a simple, efficient manner whereby the hot water is forcibly circulated at a proper temperature in intimate contact with the ground coffee maintained in suspension and agitation.

The unique and improved design of the ground coffee receptacle disclosed herein results in a more efficient and effective contact between the hot water and steam and the coffee being extracted.

During use of the apparatus disclosed herein the inner permeable container enclosing the ground coffee is caused to move up and down through the hot water during the brewing process, thus facilitating the complete and rapid extraction of the grounds. Means are also provided whereby, after the coffee has been brewed, the grounds container can be elevated above the liquid level and the extracted grounds allowed to drain.

The technique and apparatus devised and disclosed herein provide a method of minimizing the loss of the more volatile aromatic and flavor constituents of the coffee. This advantage is realized by immersing the coffee in the water immediately and thus avoiding the deleterious effects produced by heating the coffee dry.

Thus, this invention provides a simple and efficient apparatus and technique whereby through an improved and novel coffee receptacle design, turbulent action, coffee receptacle movement, vigorous agitation, and controlled temperature and time, a reliable and reproducible coffee of superior strength, aroma and flavor can be brewed.

Further and other objects, uses and advantages will be apparent as the disclosure proceeds and the description is read in conjunction with the accompanying drawings, in which:

FIGURE 1 is a perspective view of a hot plate with a coffee maker on the hot plate and a frame supporting the coffee maker, the coffee maker being an embodiment of the instant invention;

FIGURE 2 is a side view of the coffee maker shown in FIGURE 1;

FIGURE 3 is a cross-sectional view of the coffee maker shown in FIGURE 2;

FIGURE 4 is a cross-sectional view of a portion of a coffee basket shown in FIGURES 1 and 3.

Figure 5:
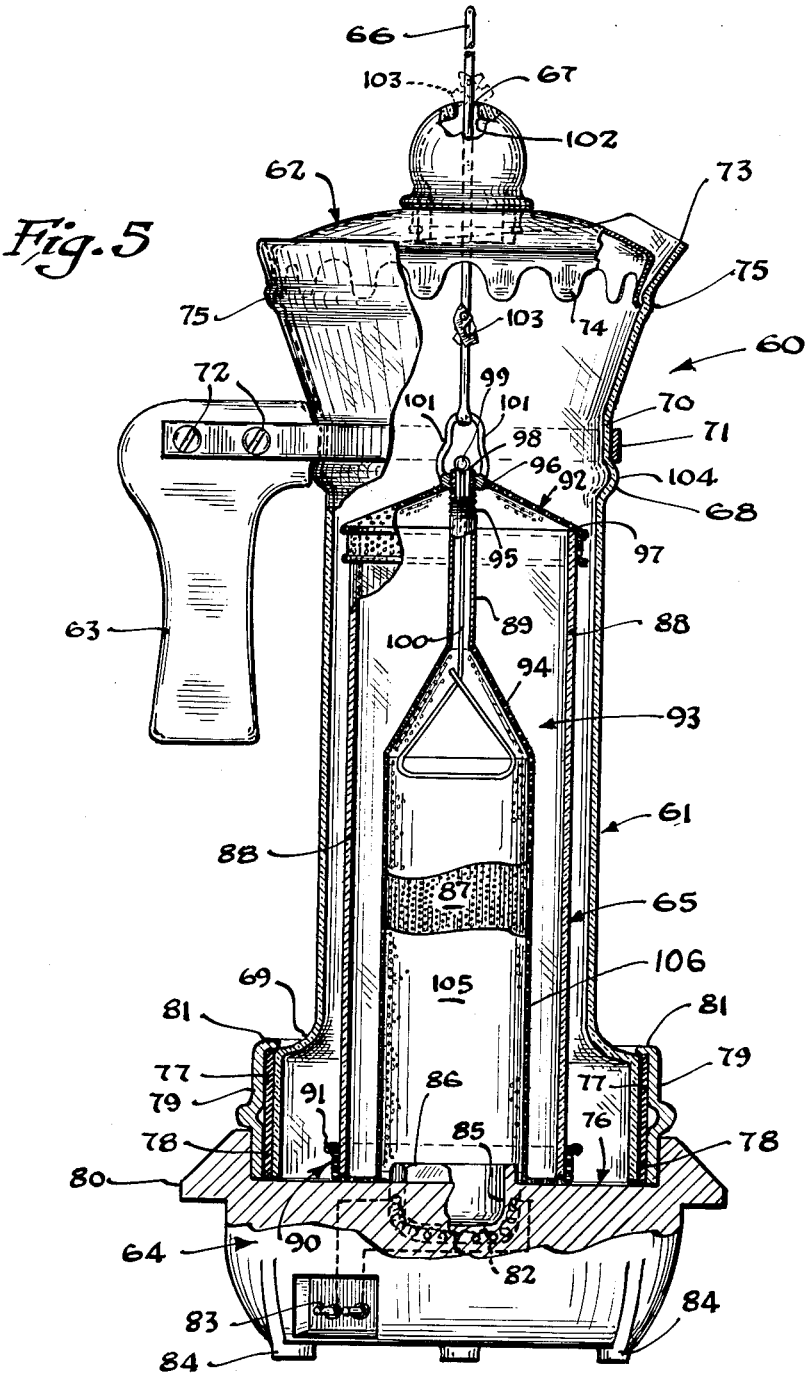
FIGURE 5 is a cross-sectional view of another preferred embodiment of the instant invention.

Referring now to the drawings, and particularly to FIGURES 1-4 thereof, numeral 11 generally indicates a hot plate, and a coffee maker, indicated by numeral 12, is positioned on the hot plate 11. The hot plate 11 has a base 10 which contains a heating element 13 consisting of a coiled resistant wire, and surrounding the heating element 13 is a plurality of apertures 14. Attached to the hot plate 11 is a pair of insulating handles 15 providing a convenient means for handling the hot plate 11. Legs 16 are fixed to the bottom of the base 10 by a convenient fastening means to raise the base 10 off a surface, such as a table top or a counter of a breakfast nook to protect the base from damage by spilled liquids or any other such contingency. The hot plate is conventional.

A frame 17 has legs 18 positioned in four of the holes 14 to attach the frame 17 to the base 10. A central portion 19 of the frame 17 is bowed outwardly to receive the coffee maker 12, thus providing vertical supporting means to the coffee maker 12 to reduce the hazard of tipping and to position the coffee maker directly over the heating element 13 for maximum heating efficiency.

The coffee maker 12 consists of a cylindrical coffee vessel 21 with a piston-like coffee basket 22, a piston-rod-like basket handle 23 and basket legs 24 positioned therein, as may be seen in FIGURES 1, 2 and 3.

In this instance, the coffee vessel 21 is made of a heat-resistant, cylinder-shaped glass, such as Pyrex, which is not affected by thermal shock. However, it should be noted, that the glass coffee vessel 21 may be made with the lower end bonded to a suitable metal base, such as aluminum, stainless steel, porcelanized steel, or any of a number of materials used in making kitchen utensils. The vessel 21 shown in FIGURES 1, 2 and 3 has a bottom 25 and a cylindrical sleeve 26 integral therewith, and an enlarged cylindrical upper portion 27 is joined to the cylindrical sleeve 26 by a flared junction 28. Integral with the upper portion 27 is a pouring lip 29 which provides a means for easier pouring from vessel 21. The central portion of the upper portion 27 contains an annular indentation 31 which receives a metallic handle band 32 to which is attached an insulating handle 33 by means of bolts 30. The handle 33 is made of wood but it may be made of any convenient insulating material, such as a Bakelite plastic or glass.

The coffee basket 22 has a bottom closure 34 made of a perforated metal, such as stainless steel, or of any other suitable material. The bottom closure 34 shown in FIGURES 1 and 3 has a frusto-conical section 35 in the central portion thereof and a bottom retaining ring 36 at its outermost edge. The diameter of the bottom closure is slightly less than the diameter of the cylindrical sleeve 26 of vessel 21 so that the bottom closure may move up and down freely within the vessel 21 but with little clearance between the sleeve 26 and the outer edge of the bottom closure for the piston and cylinder action.

Formed in the central portion of the frusto-conical section 35 is a central aperture 37. A metallic tube 38 is attached to the aperture 37 providing a free passage through the bottom closure 34. Proximate the free end of tube 38 are external threads 39 integral therewith.

An imperforated cylindrical retainer 41 open on both ends registers with the bottom retaining ring 36 of bottom closure 34 though the retainer 41 may be perforated. The retainer 41 is made of an imperforated glass tube, but any other suitable material may be used, for instance, stainless steel or aluminum.

Registering with the other end of retainer 41 is a perforated top closure 42 having a perforated closure plate 43 and a top retaining ring 44 integral therewith. The outer diameter of top closure 42 is slightly less than the interior diameter of sleeve 26 for free movement within the vessel 21. In the central portion of the closure plate 43 is an aperture 45 with a nut 46 soldered proximate thereto, as may be seen in FIGURES 3 and 4. The aperture 45 and nut 46 receive tube 38 as the top retaining ring 44 registers with retainer 41. The nut 46 has interior threads 47 integral therewith which mate with threads 39 of tube 38.

Thus, the coffee basket 22 is assembled by placing one end of cylindrical retainer 41 within the bottom retaining ring 36 of bottom closure 34; then, the top closure 42 is fastened onto tube 37 by means of mating threads 39 and 47, while the retaining ring 44 is positioned in registry with the other end of retainer 41.

A handle bridge 48 is attached to the closure plate 43 by inserting the ends of the bridge through perforations in the closure plate 43 and soldering the ends into position. Attached to the handle bridge 48 is the longitudinally extending rod-like basket handle 23 made of a single piece of metallic wire of which one end is soldered to bridge 48 and the other end has a minute ball 49 fixed thereto.

The four basket legs 24 are attached to the bottom closure 34 of the piston-acting coffee basket 22. In this instance, the legs are soldered to the bottom closure although any mechanical means of attaching the legs is acceptable. The length of the legs is less than the diameter of the coffee basket 22 for reasons that will be explained below. The volume bounded by the bottom closure 34 of the coffee basket 22, the cylindrical sleeve and bottom 25 define a steam chamber 52 which is proximate the heating element 13 of hot plate 11.

*Operation*

The vessel 21 is filled with water to the top of the straight portion of cylindrical sleeve 26. Ground coffee beans are placed in the piston-like container formed by retainer 41 and bottom closure 34. The proportion of ground coffee beans to water is determined by the individual tastes of the person making the coffee. This proportion is by no means uniform, since some people like coffee strong and others weak, but never more than two-thirds of the container to allow space for expansion of permeated ground coffee. The top closure 42 is then connected to the coffee retainer 41 in the manner previously explained.

The coffee basket 22 with the ground coffee beans is then placed in the coffee vessel 21 and the coffee basket is submerged in the water contained in the vessel. The weight of the coffee basket is sufficient to carry the coffee basket 22 downward so that legs 24 rest on bottom 25. Should the coffee basket be made of a light material so that the ground coffee beans buoy up the coffee basket, the coffee basket may be pushed down and up piston-like in the water to hydrate the ground coffee beans and thereby reduce the buoyancy to allow the coffee basket to sink.

As the water is heated, the water begins a boiling action at the bottom 25 of vessel 21. The steam bubbles formed on bottom 25 enter steam chamber 52. As was mentioned above, the legs 24 are of a length substantially less than the diameter of the coffee basket 22, because it has been found that it is desirable for protection of the glass to raise the bottom of the coffee basket from the bottom of the vessel, but the maximum effectiveness of the coffee basket is increasesd when the length of the legs is one-fourth or less than the diameter of the coffee basket.

The excess steam formed in chamber 52 rises out through tube 38 which acts as a steam passage and water circulation means. As the steam is formed, it pushes water up out through the basket and thus through the ground coffee beans, but as the steam rises through the steam passage means, water enters the steam chamber 52 to fill the void left by the steam. This effect creates a circulatory action through the coffee which continually agitates the coffee and allows the water to contact all sides of the ground coffee bean particles, thus extracting all of the flavor.

As the water beings to boil more rapidly, the steam passage means is inadequate to carry all of the steam formed in chamber 52. The coffee basket 22 acts as a piston and the cylindrical sleeve 26 acts as a cylinder so that there is a piston and cylinder action moving the basket back and forth within the sleeve forcing the steam and hot water to pass through the coffee basket and the perforations in the bottom and top closures. The steam passing through the coffee basket extracts from the ground coffee bean particles, the aromatic flavor which is so highly essential in the coffee, and a portion of the steam as it rises through the coffee loaded basket is condensed in the water above the coffee basket 22 blending the aromatic flavor in the brewed coffee.

The turbulence of the rapidly boiling coffee also creates a further circulatory action through the coffee basket by building up a pressure in the chamber 52, and basket by building up a pressure in the chamber 52, and the piston action forces the basket slightly upward. As the steam passes through the coffee basket, it also undergoes a condensation, causing the water to surge pulsation-like back down through the coffee basket which further extracts the flavor from the coffee.

Said combination of the circulatory action of pressure combined with the back-surging action through the ground coffee beans adds much to the body and flavor of the coffee, rendering this simple apparatus economical and superior to any of the prior art apparatus.

In order to further expedite the making of the coffee, the coffee basket 22 may be raised and lowered quickly by means of rod-like handle 23. The raising and lowering creates a piston-cylinder action between the coffee basket 22 and cylindrical sleeve 26 which forces water through the basket rapidly with a final agitation bringing the coffee to the required flavor and body-fullness.

After the boiling is completed, the coffee may be, if so required, allowed to mature. Though this practice is not prevalent in the United States, it is popular in other parts of the world. Maturing the coffee means that ground coffee beans are allowed to stand in the coffee for a short while after the boiling has been stopped also allowing the thus remaining suspended sediment to fall to the bottom of the glass vessel. For those who do not like matured coffee, the coffee basket 22 may be raised from the container by means of rod-like handle 23, thus the coffee is ready for drinking.

Soon after the boiling point is reached, the heat should be turned off, or the maker removed from the heater, so that the coffee will not boil over but only boil up into the enlarged upper portion 31.

The care and cleaning of this particular coffee maker is quite simple. The coffee grounds are removed by loosening to the top closure 42 from tube 38 and spilling the grounds contained between the retainer 41 and bottom closure 34. After the grounds are spilled, the retainer 41 may be removed from bottom closure 44 and the retainer 41 is easily cleaned, as well as the bottom and top closures 34 and 42, respectively.

In FIGURE 5, the invention is disclosed as embodied in a coffee maker 60 consisting of a cylindrical vessel 61, a cover 62 for the vessel, a heat-insulated handle 63 fastened to the vessel, an electrically heated base 64 to which the cylindrical vessel is permanently affixed, and, contained within the cylindrical vessel, a freely movable piston-like receptacle 65, the piston-like receptacle adapted to contain ground coffee and to move freely up and down within the cylindrical vessel 61 in response to the buoyant effect and propellant force of steam generated below the piston-like container 65; and, attached at the top of the piston-like receptacle a longitudinally extending rod 66 protruding up through a hole 67 in the center of the cover 62 of the cylindrical vessel, the hole 67 serving as a guide for the positioning rod 66 attached to the piston-like coffee receptacle 65.

The coffee vessel 61 is preferably cylindrical and is flared to a larger diameter at the upper portion 68 and at the base 69. In the example depicted, the vessel is constructed of heat resistant glass, such as Pyrex, but any other suitable material may be used. Near the top of the vessel, an annular indentation 70 is provided to receive a metallic band 71 to which an insulating handle 63 is attached by means of bolts 72, and, integral with the upper portion of the vessel is a pouring lip 73 which assures easier pouring. A cover 62 is maintained in position by means of a spring tension flange 74 which presses into an annular groove 75 located just below the pouring spout 73.

The cylindrical coffee vessel, open at the bottom, is permanently attached at the top, metal, surface-plate 76 of the electrically-heated base 64. A watertight seal is achieved by means of a special rubber gasket material 77 formed in the annular space between the outer surface 78 of the coffee vessel and a metal flange 79 fastened at its bottom 80 to the base assembly 64 and integral at its top with a metal retaining ring 81 positioned at the shoulder of the cylindrical coffee vessel, the retaining ring 81 serving to hold the coffee vessel in place. The cylindrical vessel and its bottom closure could be made as an integral unit and of any suitable material.

The electrically-heated base 64 is essentially of the conventional type used in other types of coffee makers. The heating element 82, which is thermostatically regulated, is energized by an external electrical source connected through a conventional plug 83 and receptacle. Legs 84 raise the heater base off the supporting counter or other surface on which the entire assembly may be located. Of special significance and importance is the presence and location of an area of heat concentration located and centered directly below the piston-like coffee receptacle 65. As depicted in FIGURE 5, the situs of this heat concentration is a well 85 in the center of the floor 76 of the heater base 64, and projecting through the surface of the metal plate and up into the coffee vessel, the projection 86 providing a means of ensuring the centering of the piston-like coffee receptacle, the tubular inner cavity 105 of which positions directly over the heating well 85.

Contained within the cylindrical coffee vessel 61, and of such dimensions as to be close-fitting yet freely movable therein, the piston-like coffee receptacle 65 consists of the following principal components: an outer cylinder 88, an inner tubular foraminous flue 87 preferably coaxial with the outer cylinder 88, the flue connected to a surmounting tube 89 and with an annular base 90 into which the outer cylinder is positioned within a flange 91, and a foraminous top 92 into which the other end of the outer cylinder 88 is positioned.

A guide rod 66 welded to the top 92 of the coffee receptacle projects through a hole 67 in the top 62 of the coffee maker. The outer cylinder 88 and the foraminous top 92, together with the foraminous tubular flue 87 with its surmounting tube 89 and its annular base 90, define the space 93 in which the ground coffee is retained during the brewing process.

As depicted in FIGURE 5, the outer cylinder 88 of the piston-like coffee receptacle is an imperforated glass tube and the foraminous top and tubular inner component are of stainless steel. But any other suitable materials may be used.

The tubular inner flue 87 of the piston-like coffee receptacle tapers at its upper edge 94 to a tube 89 open and externally threaded at its free end 95 and providing thereby a fastening means by which the upper foraminous top 92 is secured thereto by a threaded portion 96, the counterpart of the threads 95 on the tube 89. The upper portion of the outer cylinder 88 of the coffee receptacle is received into the foraminous top 92, and as the top is screwed down onto the threaded tube 89, the top edge of the glass cylinder 88 positions securely against the shoulder 97 on the inside of the foraminous top, and the bottom part of the outer cylinder is secured into the annular base 90 of the tubular inner portion of the coffee receptacle.

Thus, the coffee receptacle is assembled by positioning one end of the glass cylinder 88 within the annular ring 90 of the bottom closure and the other end within the foraminous top 92 and rotating the top closure 92 relative to the bottom closure 90, so that the threaded portion 96 of the top closure fastens to the threaded end 95 of the tube 89 surmounting the foraminous tubular inner element 87 of the coffee receptacle.

The over-all outside diameter of the annular base 90 and of the overlapping foraminous top of the coffee receptacle is in each case such that the entire assembly associated therewith is freely movable within the coffee vessel proper.

A steam pressure relief valve 98, consisting of a ball 99 resting in the open top of the threaded tube 89 is held captive by a wire assembly 100 fastened to the ball. Two welded supporting struts 101 connect the foraminous top of the piston-like coffee receptacle to the rod 66. A semi-automatic latch 103 pivotally attached to the rod 66 passes through the hole 67 in the cover 62 of the coffee maker when the rod is lifted and swings outwardly thereabove for latching engagement with the top 102 of the cover 62 to support the coffee receptacle assembly in an elevated position.

The operation of the coffee maker of FIGURE 5 is as follows:

The coffee vessel 60 is filled with water to a level 104 just below the metallic handle band 71. Ground coffee is poured into the cavity 93 of the piston-like coffee receptacle 65, the quantity of coffee used depending upon individual taste, but no more to be added than would fill the container more than two-thirds of its total capacity. There must be sufficient space so that the ground coffee particles can be suspended and agitated during the brewing process. The foraminous top is then positioned and fastened in place by means of the threaded connections at the top of the tube 89 and at the apex of the foraminous top 92.

The coffee receptacle 65, with its contents, is placed in the coffee vessel 60 and submerged in the water contained therein, the coffee receptacle centering and coming to rest over the heating well 85. The top 62 of the coffee vessel is put in place and the coffee maker is ready to use.

As electrical power is supplied, the water heats and, after several minutes, the water in the well 85 begins to boil, introducing steam into the tubular cavity 105 and forcing hot water and steam through the foraminous wall 106 of the tubular flue 87 into the space 93 containing the ground coffee, and through the foraminous top closure of the coffee receptacle. A turbulent system is established and the ground coffee particles are suspended and agitated in the hot water. As the water becomes hotter and the steam generation more vigorous, the buoyancy of the steam which accumulates within the tubular cavity 105 of the piston-like coffee receptacle 65 causes the coffee receptacle to rise within the coffee vessel 60, and steam and hot water to circulate up through the foraminous annular base of the coffee receptacle and into the cavity 93 containing the ground coffee.

When the coffee container has risen, leaving the heating base, water enters the tubular cavity 105, the steam escapes therefrom, the assembly loses its buoyancy and tends to settle down again. But, as the coffee receptacle 65 descends toward the heater plate 76, steam again enters the tubular cavity 105 of the piston-like coffee receptacle and again lifts and forces the assembly up through the coffee vessel, thus maintaining constant water circulation and coffee agitation throughout the brewing cycle and ensuring complete and rapid extraction of the ground coffee contained in the space 93 defined by the walls, base and top of the piston-like coffee receptacle 65.

When the heated water reaches a predetermined thermostatically controlled temperature, of about 210° F., the electrical energy input is automatically cut off, the generation of steam ceases, the coffee receptacle 65 sinks to the bottom of the vessel, and the brewed coffee is ready for serving. At this time, however, if so desired, the coffee may be allowed to mature, that is, the ground coffee (in its container) may be left in the brewed product for a few minutes longer. During this period, the brewed coffee becomes "stronger" and any fine sediment of ground coffee beans tends to settle from the solution. If the maturing step is to be omitted, the piston-like coffee receptacle 65 may be raised by means of the guide rod 66 and removed from the coffee vessel 60. Or, after part of the brewed product has been poured from the vessel, the piston-like coffee receptacle 65 may be raised above the liquid level in the vessel and allowed to drain. During this draining step, the coffee receptacle is supported, as previously described, by the latch 103 on the guide rod 66.

The piston-like coffee receptacle is easily opened, permitting ready discard of the coffee grounds and convenient and rapid cleaning of the receptacle itself.

This application is a continuation-in-part of my pending, Serial No. 670,716, filed July 9, 1957, for Piston and Cylinder Action Coffee Maker. The entire disclosure of said application is incorporated herein by reference, to the extent that it is not inconsistent herewith.

It is to be understood that the forms of my invention, herewith shown and described, are to be taken as preferred examples of the same, and that it will occur to those skilled in the art that variations, changes and modifications may be resorted to without departing from the spirit of my invention, or the scope of the subjoined claims.

I claim:

1. A coffee maker having an open top coffee vessel with a bottom, a cylindrical sleeve integral with the bottom, and an enlarged cylindrical upper portion fixed to the cylindrical sleeve; a coffee basket comprising an imperforated open end retainer, a perforated top closure engaged with the retainer across the top thereof and having a diameter slightly less than the interior diameter of the cylindrical sleeve, a perforated bottom closure engaged with the retainer across the bottom thereof and having a conical surface, a steam passage tube attached to the bottom closure extending from the center of the conical surface throught the top closure, and fastening means for attaching the top closure to the steam passage tube; a bridge attached to the top closure; a handle attached to said bridge; and legs attached to the coffee basket supporting the basket above the bottom of the vessel and forming a steam chamber therebetween, said coffee basket being freely movable within said cylindrical sleeve and having a loose, sliding fit therewith whereby steam formed between the bottom of the basket and the vessel causes the basket to rise and fall within said sleeve during the brewing of the coffee.

2. A coffee maker having an open top coffee vessel with a bottom, a cylindrical sleeve integral with the bottom, and an enlarged cylindrical upper portion fixed to the cylindrical sleeve; a coffee basket comprising an imperforated open end retainer, a perforated top closure engaged with the retainer across the top thereof and having a diameter slightly less than the interior diameter of the cylindrical sleeve, a perforated bottom closure engaged with the retainer across the bottom thereof and having a conical surface, a steam passage tube attached to the bottom closure extending from the center of the conical surface throught the top closure, and fastening means for attaching the top closure to the steam passage tube; a bridge attached to the top closure; a handle attached to said bridge; and legs of a length less than the diameter of the top closure supporting the basket above the bottom of the vessel and forming a steam chamber therebetween; said coffee basket being freely movable within said cylindrical sleeve and having a loose, sliding fit therewith whereby steam formed between the bottom of the basket and the vessel causes the basket to rise and fall within said sleeve during the brewing of the coffee.

3. A coffee maker comprising: a container having a hollow vertically extending section of substantially uniform cross-sectional configuration; a basket adapted for receiving ground coffee and having an outer surrounding wall of cross-sectional configuration corresponding to that of said container section and being disposed in free sliding guided relationship therein; said basket having a foraminous top wall and a foraminous bottom wall spanning said outer wall and having portions of said bottom wall extending upwardly of the lower extremity of said outer wall to form therebeneath a chamber for receiving steam at the lower end of the basket; and a conduit open at its opposite ends and extending from said steam chamber through said basket to open through said top wall of the basket and to provide a vent passage which, when elevated by the rise of said basket through said container occasioned by steam pressure in said chamber, vents said chamber to release said steam pressure and to permit the basket to return to a lower position in the container wherein said conduit is again blocked by liquid in said container and steam pressure is again built up in said chamber.

4. A coffee maker comprising: a container adopted to hold water and including a hollow vertically-extending section of substantially uniform cross-sectional configuration; a basket having an outer surrounding wall of a cross-sectional configuration corresponding to that of said container, said basket being loose fitting and disposed in a steam-pressure-responsive, sliding relationship within said container; a foraminous top wall surmounting said outer wall; a foraminous annular base spanned by said outer surrounding wall; a foraminous tubular flue spanning the inner diameter of said annular base, said flue extending upward and coaxially with said outer surrounding wall; a tube open at each end and having a free passage therethrough, said tube connected to and communicating with the interior of said flue and projecting upwardly through said basket to provide a steam passage between said flue and the top of said basket; said basket being adapted to receive coffee in the space between said flue and said outer surrounding wall; and said foraminous tubular flue defining therebeneath a steam chamber; and said basket, said flue, and said tube comprising means responsive to steam pressure so that heating of water to boiling in said container provides steam pressure beneath said basket forcing steam and hot water into said chamber; and periodic escape of steam through the tube causes the basket to undergo reciprocating vertical movement within the container, forcing steam and hot water through the basket to maintain the coffee contained therein in continuous suspension and agitation facilitating thereby the efficient and rapid extraction of the coffee.

5. A coffee maker comprising: a container having a hollow vertically-extending section of substantially uniform cross-sectional configuration; a basket having an outer surrounding wall of a cross-sectional configuration corresponding with that of said container, said basket being loose fitting and disposed in a steam-pressure-responsive, freely-movable, sliding relationship within said container; a foraminous top wall surmounting said outer wall; an annular base spanned by said outer wall; a foraminous tubular flue spanning the inner diameter of said annular base, said flue extending upward and coaxially with said outer surrounding wall; a tube open at each end and having a free passage therethrough, said tube connected to and communicating with the interior of said flue and projecting upwardly through said basket to provide a steam passage between said flue and the top of said basket; said basket, said flue, and said tube comprising means responsive to steam pressure developed beneath said basket so that steam produced during boiling of water in the container causes the basket to undergo reciprocating vertical movement within the container.

6. A coffee maker comprising a principal vessel of unitary construction including a vertically extending sleeve portion of essentially uniform cross-section and containing therein a freely movable loose fitting coffee basket adapted to receive coffee and comprising an imperforate hollow surrounding side wall structure, a foraminous top closure for the basket, and a bottom closure for the basket, said bottom closure including an upwardly directed foraminous conical wall projecting toward the top closure of the coffee basket and defining therebeneath a steam receiving cavity, and a steam conduit open at its opposite ends and extending from the apex of said conical wall of said basket through the top closure of said basket; said coffee basket being freely movable within said cylindrical sleeve and having a loose sliding fit therewith whereby steam formed between the bottom of the basket and the vessel and passing into and through said steam receiving cavity and steam conduit and into and through said coffee basket causes said basket to rise and fall within said sleeve during the brewing of the coffee.

7. In a coffee maker, the combination of an outer principal vessel adapted to contain water which when heated will produce steam, a coffee basket comprising a receptacle freely movable within said outer principal vessel and having a loose sliding fit therewith, said coffee basket having a foraminous top closure, a surrounding outer wall, a bottom wall spanning said outer wall, said bottom wall defining therebeneath an upwardly extending steam receiving cavity, and a steam passage tube extending from the top of said steam receiving cavity through the top of said coffee basket.

References Cited in the file of this patent

UNITED STATES PATENTS

| | | |
|---|---|---|
| 65,461 | Woodward | June 4, 1867 |
| 793,655 | Haley | July 4, 1905 |
| 894,746 | Reynolds | July 28, 1908 |
| 1,579,636 | Borgnis | Apr. 6, 1926 |
| 1,624,606 | Lane | Apr. 12, 1927 |
| 2,234,464 | Caldor | Mar. 11, 1941 |
| 2,560,214 | Cameron | July 10, 1951 |
| 2,562,433 | Moore | July 31, 1951 |
| 2,741,976 | Faber | Apr. 17, 1956 |

FOREIGN PATENTS

| | | |
|---|---|---|
| 7,637 | Switzerland | Dec. 13, 1893 |
| 468,687 | Italy | Jan. 29, 1952 |

PO-1050
(5/69)

UNITED STATES PATENT OFFICE
CERTIFICATE OF CORRECTION

Patent No. 3,020,823      Dated February 13, 1962

Inventor(s) F. P. Musso

It is certified that error appears in the above-identified patent and that said Letters Patent are hereby corrected as shown below:

Column 8, line 4, for "throught" read --through--: same column 8, line 42, 43, and 44, delete "said basket being loose fitting and disposed in a steam-pressure-responsive. sliding relationship within said container:"; same column 8, line 45 delete ";" and insert --,--; same column 8, line 46, delete ";" and insert --,--; same column 8, line 49, delete ";" and insert --,--; same column 8, line 54, after "being" insert --loose fitting and disposed in a steam-pressure-responsive sliding relationship within said container and--; same column 8, line 71, 72, 73 and 74, delete --said basket being loose fitting and disposed in a steam-pressure-responsive, freely-movable, sliding relationship within said container;--; same column, line 75, delete both occurrences of ";" and insert in both instances --,--.

Column 9, line 3, delete ";" and insert --,--; same column 9, line 8, delete "said basket," and insert --said basket being loose fitting and disposed in a steam-pressure-responsive, freely movable, sliding relationship within said container, and--.

SIGNED AND
SEALED
NOV 10 1970

(SEAL)
Attest:

Edward M. Fletcher, Jr.
Attesting Officer

WILLIAM E. SCHUYLER, JR.
Commissioner of Patents